Feb. 9, 1926. 1,572,467
L. G. BURGESS ET AL
REFRIGERATING APPARATUS
Filed Nov. 22, 1923
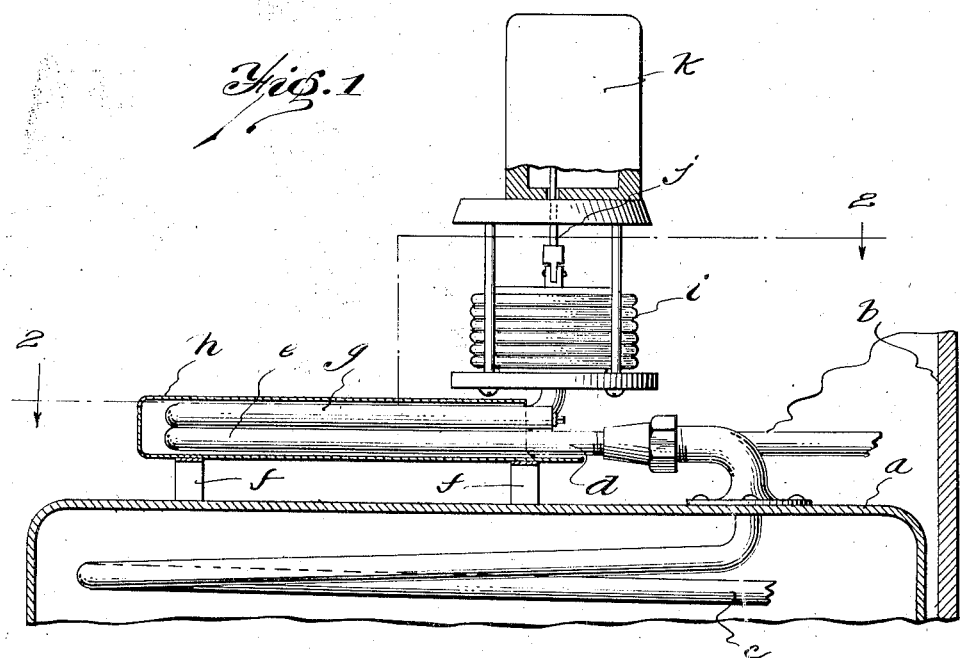
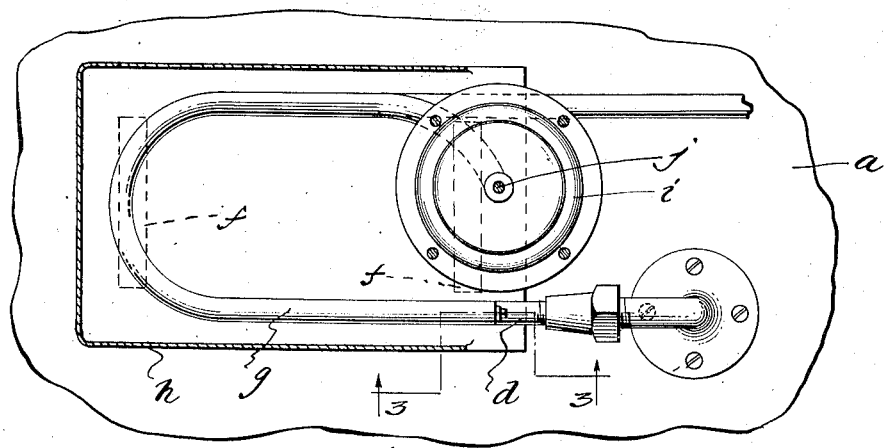
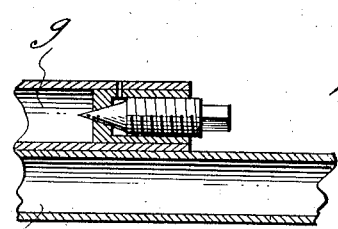
Inventors
Louis G. Burgess
Harry Thompson and
By Stuart C. Barnes
Attorney Patented Feb. 9, 1926.

1,572,467

UNITED STATES PATENT OFFICE.

LOUIS G. BURGESS AND HARRY THOMPSON, OF DETROIT, MICHIGAN.

REFRIGERATING APPARATUS.

Application filed November 22, 1923. Serial No. 676,227.

*To all whom it may concern:*

Be it known that we, LOUIS G. BURGESS, a citizen of the United States of America, and HARRY THOMPSON, a subject of the Kingdom of Great Britain, residing at Detroit, in the county of Wayne and State of Michigan, have invented certain new and useful Improvements in Refrigerating Apparatus, of which the following is a specification.

This invention relates to thermostat controls for refrigerating units and has for its object a thermostat control which is almost instantaneously responsive to a given drop of temperature or rise in temperature. In the expansion type of refrigerating machine, it is usual to use a thermostat which controls a switch that throws on and off the motor which drives the compressor. The thermostatic controls that have so far been devised, have a certain amount of drag, that is, the motor is not shut off as promptly as it should be, and again, the motor is not started as promptly as it should be. This is due to the thermostat not being influenced quickly by the changed thermol condition that exists.

It is found most desirable to have the thermostatic element responsive to the temperature of the expanded gases; when the temperature of the expanded gases falls below a given point the motor is closed off; when the temperature of the gases rises above a given point, the motor is switched on and the compressor caused to operate.

In order to carry out this plan it is customary to place the thermostatic element in the center of a coil of pipe leading from the expansion coil. This, however, results in placing the thermostatic element in a rather inaccessible position for cleaning and repairing and also results in the drag which I have already alluded to. The air space existing between the coil and the thermostatic element functions as an insulator and the theremostatic element is therefore only effected by heat acquired by convection.

It is the object of our invention to substitute for the convection principle, a direct conductive principle and a restrictive convective plan of transference of the heat. This practically eliminiates the drag that exists in usual forms of thermostatic controls and the thermostatic element is exposed where it may be easily cleaned and where it is easily accessible for repairs.

Fig. 1 is a fragmentary vertical section through a refrigerator the section being taken in the apparatus chamber.

Fig. 2 is a section taken on the line 2—2 of Fig. 1.

Fig. 3 is a section taken on the line 3—3 of Fig. 2.

*a* designates a brine tank located within the wall *b* of the refrigerator. This brine tank has an expansion coil *c*. The pipe *d* leads from the expansion coil to the compressor and is provided simply with a loop *e* that is supported on the top of the brine tank *a* by means of the brackets *f*. This loop is encased in a shield *h*. This confines the small amount of air that surrounds the loop *e* and the companion loop *g* within a small space. This makes very effective the transfer of any heat that may take place by convection. The loop *g* is part of a fluid expansion type of thermostat *i*. This thermostat is provided with a plurality of flexible folds in the form of bellows. When the fluid such as sulphur dioxide, butane, or like fluids contained in the said chambers rises in temperature one degree centigrade, the expansion is 1/273 of its volume. This causes the bellows-like folds to lengthen out and operate the electric switch control rod *j*. Similarly, when the gas is chilled, it contracts and the bellows-like folds draw together pulling down the switch controlling rod *j*.

We append to the lower portion of this bellows-like fluid expansion type of thermostat, a feeler leg *g* which is preferably in the form of a loop. This loop together with the bellows acts to increase the volume of gas by the amount in the loop. Thus we have a combination of an expansive bellows coupled with a nonexpansive chamber. This loop *g* is brought into direct physical contact with the pipe leading from the expansion coil to the compressor. The two pipes are preferably made of material having a high co-efficient of heat conductivity, to wit: copper.

We find that the most efficient way of subjecting the feeler leg of the thermostat to the influence of the gas within the discharge pipe of the expansion coil, is to provide conduit with the loop *e* and then locate the feeler leg of the thermostat in direct contact with this loop. This gives immediate contact between the walls of the feeler leg of the thermostat and walls of the discharge conduit leading from the expansion coil. Hence any thermal change of the fluid in this conduit is quickly communicated to the thermostat by reason of the transference of heat from the feeler leg to the outgoing conduit or vice-versa, from the outgoing conduit to the feeler leg.

By placing the hood or shield $h$ over these two loops we prevent a dissipation of heat by means of promiscuous convection. The two thermally related conduits are therefore bound together in not only immediate conductive relation, but intimate convective relation, so as to make almost an immediate heat transference from one fluid containing conduit to the other. This gives almost an immediate response. In short, the two fluids being laid out in parallel for a considerable distance by these two loops or other convenient forms, and the conductive shield, are kept in almost constant uniformity of temperature, the result is that the temperature of the confined fluid of the thermostat is always the temperature of the expanded gas in the cooling coil. Hence when the expanded gas falls or rises above pre-determined limits, the mechanical action of the fluid expansion type of thermostat is almost instantaneous. The electric switch $h$ is therefore operated almost immediately upon the expanded gas in the cooling coil reaching either of the pre-determined limits.

What we claim is:

1. In a refrigerating control, the combination of a conduit bearing the expanded gas of a refrigerating apparatus, a fluid expansion type of thermostat provided with a feeler leg in immediate heat conductive relation with respect to said conduit, and a shield about the feeler leg and the conduit for holding these two elements also in immediate heat convective relation with respect to each other.

2. In a refrigerating control, the combination of a conduit bearing the expanded gases of a refrigerating apparatus and forming a loop, a fluid expansion type of thermostat provided with a feeler leg in the form of a loop lying against the loop of said conduit, and a shield encasing the two said loops for holding the parts in heat conductive relation.

In testimony whereof we affix our signatures.

LOUIS G. BURGESS.
HARRY THOMPSON.